May 12, 1931.  F. S. CARR  1,805,460
NUT AND SCREW FASTENING
Filed July 22, 1925
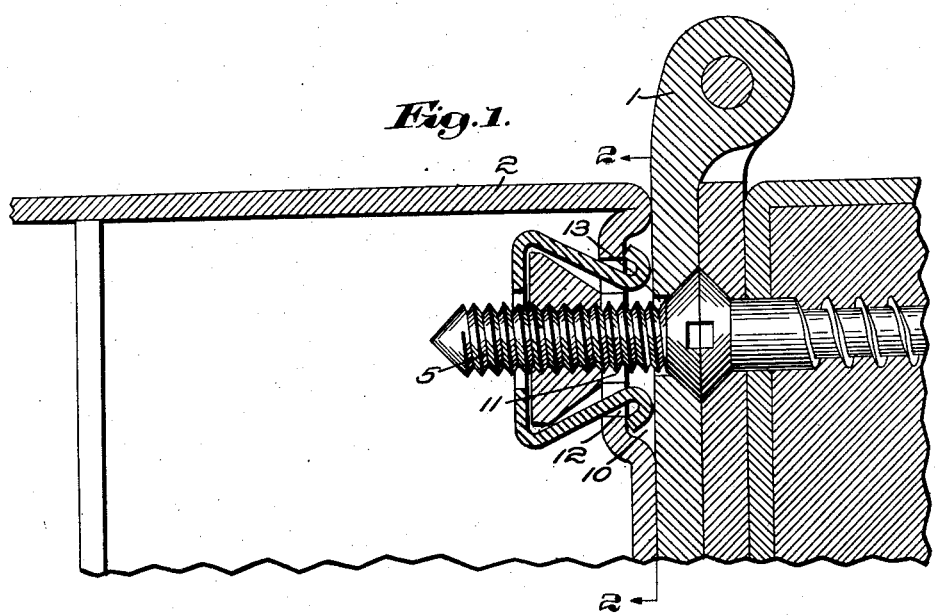
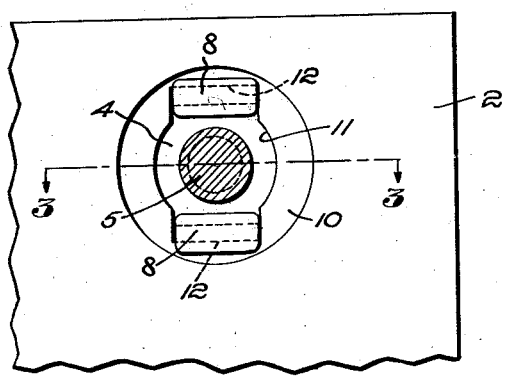
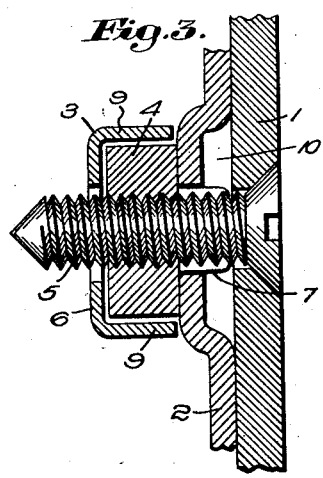
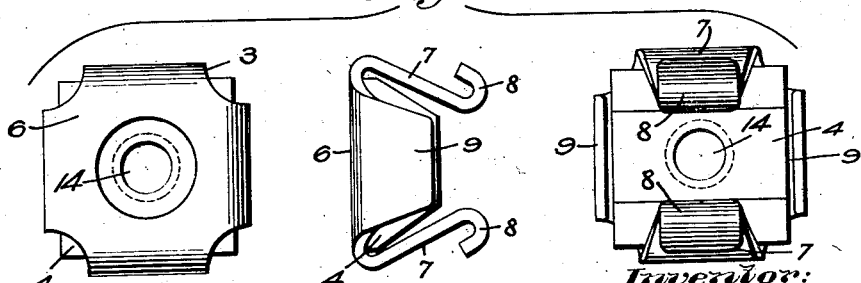
Inventor:
Fred S. Carr,
by Emery Booth Janney Varney
Attys Patented May 12, 1931

1,805,460

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

NUT AND SCREW FASTENING

Application filed July 22, 1925. Serial No. 45,273.

This invention aims to provide an improved nut and screw fastening installation.

In the drawings, which illustrate a preferred embodiment of my invention:—

Figure 1 is a plan section, partly in elevation, showing the use of a nut and screw fastening device in connection with securing a hinge to a metal door frame;

Fig. 2 is a section on the line 2—2 of Fig. 1;

Fig. 3 is a section on the line 3—3 of Fig. 2; and

Fig. 4 includes rear, side and front elevations of a nut unit.

Referring to the drawings, I have shown a nut and screw fastening device which is particularly, though not exclusively, useful for securing various kinds of fixtures to metal supports. The drawings illustrate the application of the fastening device to an automobile body for securing a hinge 1 to a metal door frame 2, as shown in Fig. 1.

The fastening device includes a nut unit comprising a holder 3 and a nut 4 assembled therewith, and a machine screw 5 for cooperative engagement with the nut unit. The nut-holder illustrated in the drawings is formed from a single piece of metal and presents a base portion 6 having a plurality of projections extending outwardly therefrom. Two of these projections provide opposed contractible and expansible converging fingers 7, 7 having reversely bent portions 8 at their free ends. The remaining two projections provide stops 9, 9 for purposes hereinafter more fully described. The nut is rectangular in outline and has two of its sides tapered for cooperation with the fingers 7, 7 to permit contraction thereof without interference from the nut.

Assembly of the nut 4 with the holder 3 may be effected either by initially forming the holder with the stops 9, 9 in the same plane as the base portion 6 and then bending them after the nut has been placed between the converging fingers 7, 7, or by forming the holder with all of the projections parallel with the axis of the holder and then bending the fingers 7, 7 to the desired angle after the nut has been placed between the projections. When the nut unit has been assembled, it will appear as illustrated in Fig. 4, and is ready for use. The stops 9, 9 are made relatively shorter than the thickness of the nut 4 so as not to interfere with the frame 2 when the nut is secured thereto as best illustrated in Fig. 3. The converging fingers 7, 7 prevent separation of the unit parts after they have once been assembled.

An important feature of the present invention is the provision for permitting the nut to shift transversely relative to the holder for purposes hereinafter described.

The frame 1 may be prepared to receive the nut unit by forming a recess 10 therein and punching, or otherwise forming, an aperture 11 through the bottom of the recessed portion. The aperture may be rectangular in outline, when viewed in plan, or it may be circular with opposed notches 12, 12, as shown in the drawings.

In assembling the hinge 1 with the door frame 2, the nut unit may be secured to the frame 2 by inserting the fingers 7, 7 in the notches 12, 12 from the inner face of the frame and then pressing upon the base 6 of the holder to force the fingers through the notched aperture. The fingers contract toward the tapered sides of the nut 4 as they pass through the aperture, and the reversely bent portions 8 snap outwardly and hook over the face of the frame at the bottom of the recess 10 after passing the wall surrounding the aperture and notches. Thus the nut unit is secured to the frame 2 and the nut is free to shift transversely in any direction relative thereto. Next the hinge 1 is placed against the frame, or in a depression provided in the frame, so that a hole 13 formed in the hinge may be in substantial alignment with the underlying nut unit. Then the screw 5 may be entered through the hole 13 in the hinge 1 and screwed into a threaded hole 14 in the nut to clamp the hinge tightly against the outer side of the frame and to clamp the nut against the inner face of the recessed portion 10, as shown in Fig. 1. The recess 10 provides a space beyond the hinge into which the reversely bent portions 8 may project without interfering with the hinge.

The nut is made thin enough to fit between the base 6 of the holder and the thickest frame material which might be used. When thinner material is used, the nut will be drawn against the inner face of the frame or support, as shown in Fig. 1.

During the screwing-together operation, the holder 3 is held against turning movement by cooperation between the sides of the fingers 7, 7 and the wall of the frame at the sides of the notches 12, 12, as shown in Fig. 2. The nut in turn is held against turning movement relative to the holder by the cooperation between the flat sides of the nut and the fingers 7, 7 and stops 9, 9, as best shown in Fig. 4. Thus when the screw is turned, there is a positive drawing together of the hinge and nut to clamp them against the frame.

It has been found that in many instances the hole in the part to be secured to the frame was not aligned with the screw-threaded hole in the nut, with the result that the screw either could not be threaded into the nut, or, if it did thread its way into the nut, it would do so at such an angle that the head of the screw would not seat squarely upon the hinge or other like part. In many instances, misalignment of parts cannot be entirely avoided. To overcome the variation in alignment of parts, the present unit has been assembled so that the nut 4 may shift transversely relative to the holder 3. The distances between the fingers 7, 7 and the stops 9, 9 are sufficiently greater than the length and width of the nut 4 to permit substantial shifting movement in any transverse direction relative to the holder 3. Both the fingers and the stops provide means for limiting the transverse shifting of the nut.

By use of the nut unit shown in the drawings and herein described, it is possible to correct misalignment of parts to a reasonable degree by simply oscillating the nut transversely relative to the frame 1 and holder 3, until the hole 14 in the nut is in perfect alignment with the hole 13 in the hinge 1. The shifting operation may be easily and quickly effected after the hinge has been placed against the frame by pushing a sharp pointed instrument through the hole 13 and into the threaded hole in the nut.

The purposes of the holder 3 of the nut unit are to hold the nut 4 in assembly with the frame, and prevent its turning, so that no tool is necessary to hold the nut while the screw is being threaded therein.

A fastening device such as described is particularly useful for securing parts together when the back face of the inner part is inaccessible after the parts are placed face to face.

While I have shown and described a preferred embodiment of my invention, it will be understood that changes involving omission, substitution, alteration and reversal of parts and even changes in the mode of operation may be made without departing from the scope of my invention, which is best defined in the following claims.

Claims:

1. A fastening unit including a nut-holder presenting opposed converging resilient fingers, a nut assembled with said holder, said nut presenting tapered sides cooperating with said converging fingers and opposed stops presented by said holder for preventing disassembly of said nut from said holder by movement of said nut transversely relative to said resilient fingers, said nut being free to shift laterally in all directions relative to said holder.

2. A nut device including a nut-holder and a nut, the nut-holder having a base upon which the nut may rest, a number of resilient fingers extending from said base toward each other and having hooked ends for securing the nut device to a suitable support, the nut being provided with tapered sides spaced from said fingers so as to permit free contraction thereof and a number of stops of shorter length than said fingers, said stops extending from said base and cooperating with said fingers to hold said nut in positive assembled relation with said holder.

3. A shiftable nut device comprising, in combination, a one-piece nut-holder presenting contractible and expansible means adapted to be snapped into an aperture in a support to secure said holder thereto, a nut substantially non-rotatably assembled with said holder and means provided as an integral part of said holder for holding said nut in positive assembled relation with said nut-holder, said nut being smaller than the space between said first and second mentioned means, thereby to permit substantial lateral shifting movement of the nut relative to the holder.

In testimony whereof, I have signed my name to this specification.

FRED S. CARR.